3,246,029
PROCESS OF PRODUCING β-CYANO-PROPIONALDEHYE
Jiro Kato, Ryoji Iwanaga, and Yoshisuke Akiyama, Tokyo, Hachiro Wakamatsu and Takashi Fujii, Kawasaki, Hitoshi Ishiwara, Musashino, and Osamu Hiwatashi, Kawasaki, Japan, assignors to Ajinomoto Co., Inc., Tokyo, Japan
No Drawing. Filed Jan. 27, 1964, Ser. No. 340,535
Claims priority, application Japan, July 3, 1959, 34/21,526
9 Claims. (Cl. 260—465.1)

This application is a continuation of our copending application Serial No. 32,086, filed on May 27, 1960, and now abandoned.

This invention relates to the production of β-cyano-propionaldehyde from acrylonitrile, and more particularly to an improved method of separating a cobalt carbonyl catalyst from a reaction mixture containing the β-cyano-propionaldehyde.

β-cyano-propionaldehyde is an intermdeiate for snythesizing glutamic acid and may be formed by reacting acrylonitrile with carbon monoxide and hydrogen in the presence of a cobalt catalyst at a high temperature and pressure. However, the yield of the conventional process is low and the separation of the β-cyano-propionaldehyde from the reaction mixture is difficult because β-cyano-propionaldehyde tends to polymerize. Manufacture of β-cyano-propionaldehyde from acrylonitrile was therefore not possible on an industrial scale because of the difficulties involved in the separation and regeneration of the catalyst, the recovery and recycling of the solvent and the like.

It is the main object of the present invention to provide a process which permits separation of the catalyst from the reaction mixture, regeneration of the catalyst, and recovery and recycling of the solvent used without loss of β-cyano-propionaldehyde from the reaction mixture.

When the reaction mixture obtained from acrylonitrile, other reactants, catalyst, and solvents in the known process is subjected to distillation in order to separate the solvent from the β-cyano-propionaldehyde, an appreciable loss of the latter due to polymerization cannot be avoided, even if the distillation is carried out at low temperature under a reduced pressure.

It is assumed that compounds of cobalt with carbon monoxide such as dicobalt-octacarbonyl, cobalt-hydrocarbonyl, tetracobalt-iodecacarbonyl (hereinafter referred to as "cobalt carbonyl") are transformed during the separation into compounds catalyzing the polymerization of the aldehyde. It is therefore necessary to decompose the cobalt carbonyl and to remove its decomposition products before β-cyano-propionaldehyde is separated from the reaction mixture.

The known processes for decomposing cobalt carbonyl may involve (1) heating the reaction mixture per se or in the presence of hydrogen under pressure, (2) treating the reaction mixture with an aqueous solution of an organic acid or its salts to extract cobalt as a soluble cobalt salt, or (3) bringing the reaction mixture in contact with air or another oxidizing agent.

Process (1) causes a significant loss of the aldehyde particularly when performed in the presence of hydrogen under pressure. The aldehyde is reduced to the corresponding alcohol Process (2) is not effective with a water-soluble aldehyde such as β-cyano-propionaldehyde, although it can be adopted when the aldehyde produced is water-insoluble; and Process (3) has been disclosed in U.S. Patent No. 2,831,029, and U.S. Patent No. 2,547,178. It has been found that a significant loss of β-cyanopropionaldehyde is inevitable with the known process.

It would be most desirable to decompose and remove the cobalt carbonyl without loss of the formed aldehyde, and to recover the catalyst in a state suitable for re-use. U.S. Patent No. 2,831,029 describes a loss of aldehyde amounting to about 10% in the known process. Although U.S. Patent No. 2,547,178 does not mention the loss, the same percentage loss as in the process of U.S. Patent No. 2,831,029 may be safely assumed.

We have found that cobalt carbonyl when brought into contact with air, oxygen or other oxidizing agents as a complex salt, is very easily and completely decomposed in the reaction mixture without accompanying loss of the aldehyde. The decomposed cobalt carbonyl may be separated from the reaction mixture by means of a mineral acid which forms a crystallized salt. Cobalt may be removed from the solution as an insoluble compound in the absence of a mineral acid. The choice of the separation method depends upon the solvents used and other factors. When cobalt carbonyl contained in the oxo-reaction mixture is decomposed according to the above-mentioned process, the decomposition of cobalt carbonyl and the recovery of β-cyano-propionaldehyde from reaction mixtures employing different solvents has been found as follows:

| Solvent | Recovery of aldehyde (percent) | Decomposition of cobalt carbonyl (percent) |
|---|---|---|
| Benzene | 74.5 | 89.6 |
| Toluene | 82.6 | 91 |
| Methanol | 99.7 | 100 |
| Acetone | 99.8 | 97.8 |
| Ethanol | 99.7 | 99.5 |
| Isopropanol | 99.5 | 98 |

The above results were obtained by passing air through solutions containing 1.2 g./l. cobalt as cobalt carbonyl, and 2.4 mol/l. of β-cyano-propionaldehyde at 40° C. for 30 minutes. The aldehyde and cobalt contents were determined by the hydroxylamine method and by colorimetry respectively before and after the decomposition.

As is evident from the above table, the aldehyde loss is markedly less in a solvent such as acetone or alcohol which forms a complex salt with cobalt carbonyl than in the case of benzene or toluene. The difference is due to the fact that cobalt carbonyl forms complex compounds with so-called Lewis bases such as methanol, ethanol, or like alcohols, acetone and similar ketones, tetrahydrofuran and like cyclic ethers by homomolecular disproportionation, which dissociates cobalt carbonyl into cobalt cation and cobalt carbonyl anion as follows:

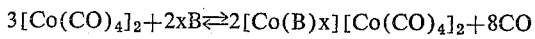

$3[Co(CO)_4]_2 + 2xB \rightleftarrows 2[Co(B)x][Co(CO)_4]_2 + 8CO$

In benzene, toluene and similar non-polar solvents, cobalt carbonyl remains unchanged.

It is assumed that the decomposition of cobalt carbonyl in the form of the complex salt and the decomposition of unchanged cobalt carbonyl follow different paths, and that the intermediates formed during decomposition of the complex carbonyl do not catalyze the aldehyde polymerization.

We have measured the change in the absorption of infrared rays taking place during the decomposition of cobalt-carbonyl. When air is introduced into a methanol solution containing cobalt carbonyl, the absorption at 1902 cm.$^{-1}$, which is characteristic of cobalt carbonyl anion, is seen until the decomposition is complete. When air is introduced into a benzene solution containing cobalt carbonyl, the absorption at 1902 cm.$^{-1}$ which is seen faintly at first, disappears in an early stage of decomposition. This indicates that cobalt carbonyl in methanol solution is decomposed through an intermediate cobalt carbonyl anion, but not in a benzene solution.

As mentioned above, alcohols, ketones, cyclic ethers and like neutral solvents capable of forming a complex salt with cobalt carbonyl make it possible completely to decompose the carbonyl without accompanying appreciable loss of β-cyano-propionaldehyde. It is an additional advantage of these solvents that the oxo-reaction of acrylonitrile proceeds at a higher reaction rate in said solvents than in benzene or like hydrocarbon solvents. Alcohols, ketones, cyclic ethers and like polar solvents are therefore advantageous in the preparation of β-cyano-propionaldehyde from acrylonitrile.

After the cobalt carbonyl has been decomposed and the cobalt compound formed has been removed, the remaining solution may be subjected to distillation to separate the solvent and the aldehyde.

When the oxo-reaction of acrylonitrile is carried out in a solvent containing an alcohol, a portion of the β-cyano-propionaldehyde formed is present in the reaction mixture as the acetal of the alcohol. When working with an alcohol bearing solvent medium, we prefer to add sulfuric acid or a similar non-volatile inorganic acid to the reaction mixture somewhat in excess of the cobalt carbonyl equivalent, to introduce air to decompose the carbonyl, to remove the cobalt salt formed from the solution by means of an H-type cation exchange resin, and to subject the solution to distillation in order to hydrolyze the acetal and simultaneously to recover the solvent.

However, prolonged heating in a sulfuric acid solution reduces the yield of β-cyano-propionaldehyde as shown in the following table. The conventional distillation apparatus having a distillation vessel with heated bottom therefore causes a loss of the aldehyde. When an aqueous solution of 2 moles/liter β-cyano-propionaldehyde in 0.2 N sulfuric acid is heated to 100° C., the aldehyde content decreases as follows:

| Heating time (min.) | 0 | 5 | 10 | 20 | 30 | 40 |
|---|---|---|---|---|---|---|
| Aldehyde (percent) | 100 | 98.5 | 96.5 | 94.2 | 93.7 | 92.2 |

We have found that this loss can be avoided by a modified distillation procedure. According to our method, the reaction mixture containing β-cyano-propionaldehyde, the corresponding acetal, and a solvent alcohol together with added sulfuric acid or similar mineral acid is introduced into the central portion of a distillation column. Steam is blown into the column bottom, and a distillation under ordinary pressure is carried out. The time required for the distillation is substantially shortened, and no measurable loss of β-cyano-propionaldehyde is observed. An aqueous solution of the latter is drawn from the column bottom, and the alcohol is recovered from the top. The β-cyano-propionaldehyde can be converted by Strecker's reaction to glutamic acid. The recovered alcohol may be used as the solvent for the next batch of acrylonitrile in the oxo-process. If it is methanol or a similar alcohol which does not form azeotropic mixtures with water, it may be recycled directly. The recovered alcohol requires dehydration, if it forms azeotropic mixtures with water.

The following examples illustrate the invention but are not to be construed as limiting the same:

Example 1

475 ml. of a reaction mixture obtained by the oxo-reaction of acrylonitrile in the presence of cobalt carbonyl contains 635 milli-moles of β-cyano-propionaldehyde and 0.62 g. cobalt as cobalt carbonyl. The mixture is placed in a flask of 600 ml. capacity and air is blown through it at room temperature for 30 minutes. The cobalt carbonyl present is completely decomposed. The end point is observed by the development of a blue tint due to a minute quantity of methylene blue previously added as an indicator. The precipitated cobalt compound is removed, and acetone is distilled off. The remaining solution is transferred to a Claisen flask and distilled at reduced pressure. 50.6 g. of a fraction boiling about 70° C. at 3 mm. Hg are obtained. This fraction contains 83% β-cyano-propionaldehyde and the yield is 98%.

In a comparative experiment the oxo-reaction mixture is distilled directly at reduced pressure without first decomposing the cobalt carbonyl. The contents of the flask resinify due to polymerization during the distillation, and no high-boiling fraction is obtained.

Example 2

100 ml. of a reaction mixture obtained by the oxo-reaction of acrylonitrile in methanol in the presence of cobalt carbonyl contain 255 milli-mode of β-cyano-propionaldehyde and of its dimethyl-acetal, and 0.12 g. cobalt as cobalt carbonyl. The mixture is placed in a flask which is vigorously shaken for 3 minutes at 25° C., whereby its contents are brought into contact with air. The cobalt carbonyl present is decomposed and a brownish cobalt compound precipitates. A clear solution is separated from the precipitate by centrifuging and is found to contain 17.5 mg. cobalt. When this clear solution is passed through a column of Diaion SK #1 of H-type (a cation exchange resin of polystyrene sulfonic acid type), there is obtained a yellowish brown solution free from cobalt. The same quantity of β-cyano-propionaldehyde and its dimethyl-acetal found in the reaction mixture before the decomposition of cobalt carbonyl is again found in the clear centrifuged solution and in the yellowish brown solution.

The cobalt compound precipitated and separated from the remainder of the reaction mixture can be easily converted into cobalt carbonyl by dispersing it in methanol, and passing carbon monoxide and hydrogen through the suspension formed at 113° C. under a pressure of 200 atmospheres.

Example 3

An oxo-reaction mixture obtained by reacting acrylonitrile with a mixture of hydrogen and carbon monoxide (ratio 1:1) in methanol in the presence of cobalt carbonyl at a temperature of 130° C. under a pressure of 200 atmosphere, contains 1.2 g./l. cobalt and 2.55 moles/liter of β-cyano-propionaldehyde and of its dimethyl-acetal. 0.12 percent concentrated sulfuric acid are added and mixed in. The solution is introduced from the top into a decomposition tower made of glass, 140 cm. high and 3.0 cm. in diameter, which is charged with stainless steel screen saddles of 100 mesh and 8 mm.$^2$ area, at a rate of 8 liters per hour at 30° C. At the same time air is introduced into the tower bottom at a rate of 20 liters per hour at room temperature. The solution withdrawn from the bottom of the decomposition tower contains no cobalt carbonyl, but 9.9% of the β-cyano-propionaldehyde and of its dimethyl-acetal present in the solution before the decomposition of the cobalt carbonyl. The withdrawn solution is passed through a column of Diaion SK #1 of H-type. The decomposed cobalt compound is completely adsorbed and the effluent solution contains no cobalt.

Example 4

The same oxo-reaction mixture as used in the foregoing example (Example 3) is mixed with 6 volume percent of 3 N sulfuric acid. The solution is passed through a decomposition tower charged with the same packing material as in the foregoing example. The tower is 140 cm. high and 4.3 cm. in diameter, and the acid solution is introduced at a rate of 10 liter per hour at 30° C. Air is fed counter-current from the tower bottom at a rate of 28 liters per hour. As in the preceding example, no cobalt compound crystallized from the solution withdrawn from the bottom, which contains the same quantity of β-cyano-propionaldehyde and its dimethyl-acetal as prior to the decomposition. The withdrawn solution is passed through a column of Diaion SK #1 of H-type. No cobalt is found in the effluent solution.

The cobalt-free solution is introduced into a distilling column, 380 cm. high, 10 cm. in diameter, and packed with porcelain Raschig rings of 1.0 cm. length and 1.0 cm. diameter. The solution is fed to the center section of the column at a rate of 7.7 liters per hour at 67° C. and steam of 4 kg./cm.$^2$ is blown into the column bottom to maintain 0.02 atmosphere gauge pressure. The distillation is performed at a reflux ratio of 1.4. The aqueous solution discharged from the bottom of the column contains neither the dimethyl-acetal of β-cyano-propionaldehyde nor methanol, but β-cyano-propionaldehyde equivalent to 99.3% of the β-cyano-propionaldehyde and its dimethyl-acetal originally present in the solution fed to the distillation column. The aldehyde concentration is approximately 2 mol/liter. The distilled methanol from the top contains 0.3% water and can be used again as a solvent for the next batch in the oxo-reaction of acrylonitrile.

*Example 5*

Acrylonitrile is reacted with a mixed gas of hydrogen and carbon monoxide (ratio 1:1) in an isopropanol medium in the presence of cobalt carbonyl at 130° C. under a pressure of 200 kg./cm.$^2$. The oxo-reaction mixture obtained contains 1.1 g./l. cobalt, as cobalt carbonyl, and 2.43 mol/l. of β-cyano-propionaldehyde and of its di-isopropyl-acetal, and is mixed with 6 volume percent of 3 N sulfuric acid. The solution is introduced from the top into the decomposition tower described in Example 3 at a rate of 6.0 l. per hour at 28° C. Air is simultaneously passed through the tower from the bottom at a rate of 18 l. per hour. The solution obtained from the bottom is passed through a column of a strongly acidic ion exchange resin of the H-type. The effluent solution is free from cobalt, but contains 99.8% of the original β-cyano-propionaldehyde. The isopropanol solution of β-cyano-propionaldehyde free of cobalt is introduced into a distillation column 320 cm. high, 7.5 cm. in diameter, and charged with glass Raschig rings of 0.6 cm. length and 0.6 diameter. The solution is fed to the central portion of the column at a rate of 6 liters per hour. Steam at 100° C. is simultaneously introduced into the column bottom at a rate of 5 kg. per hour. The distillation is performed at a reflux ratio of 1.0. An aqueous solution of 2 moles/liter β-cyano-propionaldehyde is withdrawn from the column bottom. The yield is 99.8% with respect to the solution fed to the column. From the top, isopropanol of azeotropic composition containing 9 volume percent of water is obtained. This isopropanol is mixed with benzene and distilled to remove the water therefrom. The anhydrous isopropanol obtained is used as a solvent for the next batch of acrylonitrile in the oxo-reaction.

While the invention has been described with particular reference to specific embodiments, it is to be understood that it is not limited thereto, but is to be construed broadly and restricted solely by the scope of the appended claims.

What is claimed is:
1. In a method of removing a cobalt carbonyl catalyst from the liquid reaction mixture obtained in the oxo reaction of acrylonitrile, said reaction mixture containing β-cyano-propionaldehyde and cobalt carbonyl, the steps of:
   (a) contacting said reaction mixture approximately at room temperature with gaseous oxygen in the presence of a liquid solvent selected from the group consisting of methanol, ethanol, isopropanol, acetone, and tetrahydrofuran, until said cobalt carbonyl is substantially completely decomposed, and
   (b) removing the decomposed cobalt carbonyl from the remainder of the reaction mixture.
2. In a method as set forth in claim 1, said reaction mixture being contacted with said gaseous oxygen in the presence of a non-volatile inorganic acid.
3. In a method as set forth in claim 2, said acid being surfuric acid.
4. In a method as set forth in claim 2, said liquid solvent being a lower alkanol.
5. In a method as set forth in claim 2, said liquid solvent being acetone.
6. In a method as set forth in claim 2, said liquid solvent being tetrahydrofuran.
7. In a method as set forth in claim 1, distilling said remainder of said reaction mixture to substantially isolate said liquid solvent.
8. In a method as set forth in claim 1, said decomposed cobalt carbonyl being removed from said remainder by passing the remainder of the reaction mixture over an H-type cation exchange resin.
9. In a method of removing a cobalt carbonyl catalyst from a liquid reaction mixture obtained in the oxo reaction of acrylonitrile, said reaction mixture containing β-cyano-propionaldehyde and cobalt carbonyl, the steps of:
   (a) contacting said reaction mixture substantially at room temperature with gaseous oxygen in the presence of a lower alkanol and an aqueous solution of a non-volatile mineral acid until said cobalt carbonyl is decomposed and a cobalt salt of said acid is formed therefrom in the resulting medium;
   (b) contacting the medium containing the cobalt salt with an H-type cation exchange resin to remove cobalt from the remainder of the medium; and
   (c) heating said remainder until said alkanol is substantially driven off.

References Cited by the Examiner

UNITED STATES PATENTS

| | | | |
|---|---|---|---|
| 2,476,263 | 7/1949 | McKeever | 23—203 |
| 2,831,029 | 4/1958 | Vergilio et al. | 260—465.1 X |
| 2,978,481 | 4/1961 | Kato et al. | 260—465.1 |
| 3,028,220 | 4/1962 | Giraitis et al. | 23—203 |
| 3,053,629 | 9/1962 | Pruett et al. | 23—203 |

CHARLES B. PARKER, *Primary Examiner.*

JOSEPH P. BRUST, *Assistant Examiner.*